Feb. 18, 1964        G. A. KLATCHKO        3,121,326
ULTRASONIC SCANNING HEAD
Filed Dec. 1, 1960
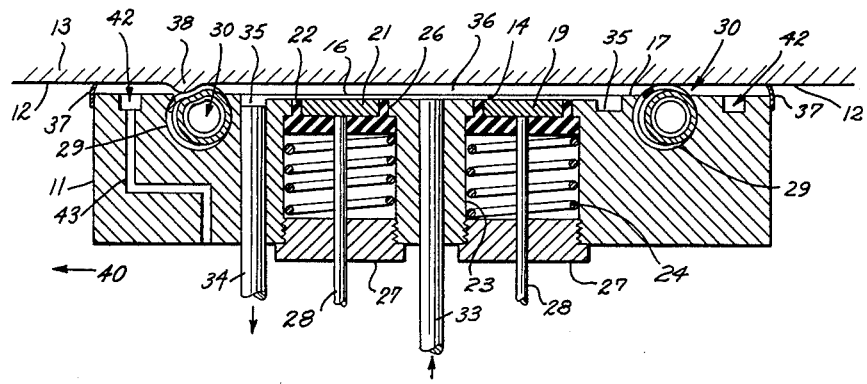
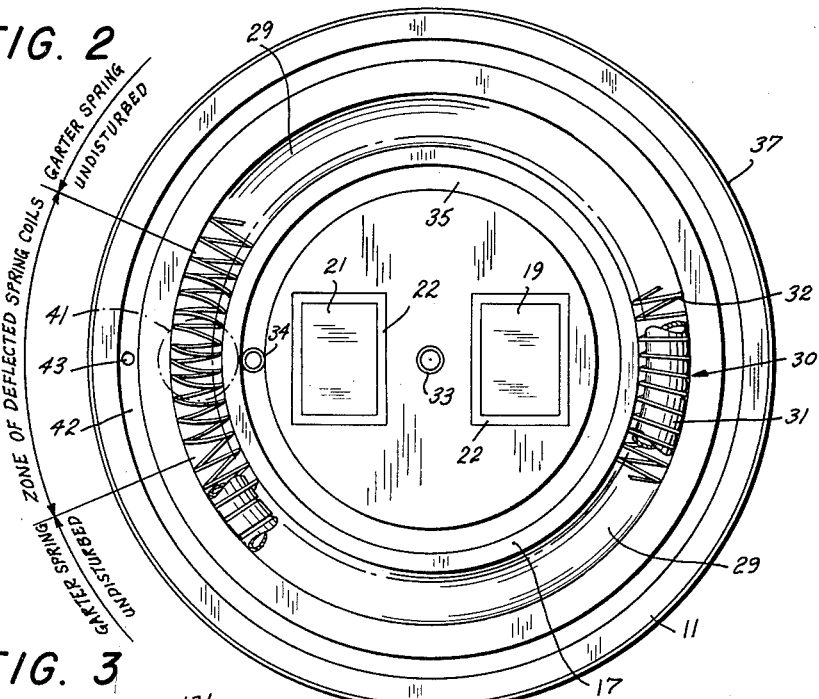
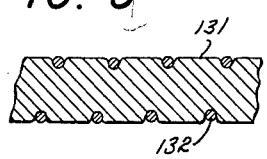
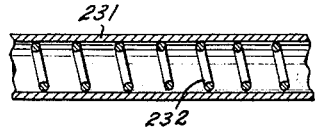
INVENTOR.
GEORGE A. KLATCHKO
BY Harold W. Adams
ATTORNEY

United States Patent Office 3,121,326
Patented Feb. 18, 1964

3,121,326
ULTRASONIC SCANNING HEAD
George A. Klatchko, Levittown, Pa., assignor, by mesne assignments, to The Budd Company, Philadelphia, Pa., a corporation of Pennsylvania
Filed Dec. 1, 1960, Ser. No. 72,908
4 Claims. (Cl. 73—67.7)

This invention relates to an ultrasonic scanning head and more particularly to an ultrasonic gap scanning head for nondestructively testing objects.

Nondestructive methods of testing materials for defects have been developed using ultrasonic vibrations. In known methods of ultrasonic testing the piezoelectric crystal or transducer element is sometimes held directly against the surface of the object to be inspected. In order to scan the entire surface of the object it is necessary to move the transducer element and the object with respect to each other.

In such cases surface irregularities on the object may scratch and damage the face of the transducer element, impairing the reliability of the ultrasonic transducer element. In addition such irregularities introduce air between the face of the transducer element and the surface of the object under test. This causes a poor acoustic coupling between the transducer and the object with resultant loss in sensitivity.

To avoid these harmful results a thin film of liquid couplant such as oil is used to provide a good acoustic coupling but the film of oil does not protect the face of the transducer element from surface irregularities such as burrs, sharp projections and the like. So even though contact-type ultrasonic scanning techniques are effective, it has been difficult if not impossible, until now, to adequately protect the transducer element during the scanning operation.

Therefore, it is an object of this invention to provide an ultrasonic gap scanning head in which the transducer element is protected from scratching, shock and other damage caused by surface imperfections and irregularities on the object scanned.

Another object of this invention is to provide an ultrasonic gap scanning head in which a constant uniform gap is maintained between the transducer element and the surface of the object being scanned.

Still another object of this invention is to provide an ultrasonic gap scanning head in which imperfections and irregularities on the surface of an object being scanned pass under the gap scanning head without changing the gap distance between the transducer element and the surface of the object.

Yet another object of this invention is to provide an ultrasonic gap scanning head in which a layer of liquid couplant is maintained between the transducer elements and the surface of the object being scanned.

Another object of this invention is to provide an ultrasonic gap scanning head including means for forming and sealing a gap between the scanning head and the surface of the object being scanned.

Apparatus embodying the principles of my invention for accomplishing these and many other objects may include a scanning head having one or more transducer elements resiliently mounted therein.

A spring spacing and sealing means surrounds the transducer elements and is sufficiently soft and resilient to yield locally when the scanning head is passed over any surface unevenness or irregularity of the object. At the same time a constant gap is maintained between the scanning head and the object. Means are provided for maintaining oil under pressure in the gap to couple the transducer element with the surface of the object inspected. The oil provides a good transmission path for ultrasonic energy between the transducer and the object. The spring spacing and sealing means maintains the gap constant while at the same time sealing the gap. Wiper means wipe the surface of the object clean as the scanning head passes thereover.

Other objects and advantages of my invention will become apparent from the following description when taken in view of the accompanying drawings in which:

FIGURE 1 is a cross-sectional view of my invention illustrating the manner in which my ultrasonic gap scanning head is spaced from the surface of an object being scanned;

FIGURE 2 is an end view of my ultrasonic scanning head illustrating the effect of a surface irregularity passing under the scanning head;

FIGURE 3 is a sectional view of an alternative embodiment of my spacing and sealing means; and FIGURE 4 is a sectional view of another alternative embodiment of my spacing and sealing means.

Referring now to FIGURE 1 a cross-sectional view of a circular scanning head 11 is shown in a scanning position passing over the surface 12 of an object 13. The scanning head 11 is formed of an insulating material such as Bakelite or rubber and is provided with a recess 14 in an inner face 16 nearest the surface 12 of the object 13. The recess 14 forms an annular shoulder 17 around the periphery of the scanning head 11.

A sending transducer element 19 transmits ultrasonic waves into the object 13 and a receiving transducer 21 receives the ultrasonic waves reflected by defects in the object 13. The transducers 19 and 21 are each mounted in an insulating, acoustic attenuating holder 22.

The holders 22 are each resiliently mounted in a bore 23 extending through the scanning head 11. Compression springs 24 normally hold the respective holders 22 against annular shoulders 26 extending into the bores 23. Plugs 27, threaded into the opposite end of the bores 23 against the compression springs 24 permit easy loading and adjustment of the transducers 19 and 21 in the bores 23.

Suitable electrical connectors 28 extend through the plugs 27 and are connected to the sending transducer 19 and the receiving transducer 21. If desired, a single sending and receiving transducer element may be employed rather than the sending and receiving transducers 19 and 21 which are shown for purposes of illustration only. As ultrasonic inspection is well known the actual inspection need not be described in detail.

An annular arcuate groove 29 formed in the head 11 around the transducers 19 and 21 receives a supporting and sealing garter spring and tube assembly 30 which comprises an inflated, soft, flexible tube 31 inside a resilient garter spring 32 (see FIG. 2). The garter spring 32 is normally form-retaining as to its cross-sectional diameter and is sufficiently resilient and flexible as to coil spacing so that it can yield where necessary under unusual pressures caused by large irregularities on the object surface. Also, due to the aforesaid spring flexibility the tube internal pressure causes extrusion of portions of the soft yielding tube wall between adjacent coils of the garter spring 32 so that the extruded portions make contact with the object surface. Accordingly, it will be seen that the tube and spring are combined and coupled so as to form an integral gap spacing and liquid sealing ring as presently described in more detail.

As shown in FIG. 1, the arcuate groove 29 extends through slightly more than 180°. The garter spring and seal assembly 30 snaps in place when inserted in the groove 31. The snap fit permits this ring assembly 30 to be securely held in place during operation but easily removable for cleaning and servicing of the scanning head 11.

A suitable liquid couplant such as oil is pumped under pressure into the recess 14 through a centrally located oil supply inlet 33 and removed from the recess 14 through an oil outlet 34 which opens into an annular oil return groove 35. The annular oil return groove 35 is formed in the head 11 around the circumference of the recess 14 and insures the proper oil flow in the recess 14 between the oil inlet 33 and oil outlet 34.

As shown in FIG. 1 the ring assembly 30 uniformly spaces, primarily by means of the form-retaining garter spring the scanning head 11 from the object surface 12, thus forming a sealed gap 36 of fixed distance between the transducers and surface 12. This distance is not varied to any material extent by scanned surface irregularities by reason of but local yielding of the extruded portions of the soft tube, and (in the case of large irregularities) of local flattening of the garter spring coils.

The oil, forced into the gap 36 under pressure, maintains a uniform thickness of liquid couplant in the gap.

The garter spring and seal assembly 30 resists the oil pressure in the gap 36, and in doing so the soft flexible tube 31 is extruded further between the coils of the garter spring 32. This is similar to the reaction of an O-ring and further enhances the sealing action of the ring assembly 30.

A circular catch-groove 42 is formed in the head to catch any lubricant forced between the garter spring and tube assembly 30 and the surface 12 of the object 13 during a testing operation. Since the flexible tube 31 is extruded between and around the coils of the spring 32 into engagement with the surface 12 of the object 13, there will be little oil seepage into the catch-groove 42. An oil return line 43 extends through the scanning head 11 and opens into the catch-groove 42.

A wiper 37 formed of neoprene or the like extends completely around the outer edge of the scanning head 11 and into engagement with the surface 12 of the object in order to wipe the surface 12 of the object 13 clean as the scanning head 11 passes over it. The wiper 37 also acts as a seal and forces any excess oil into the catch groove 42.

In operation the scanning head 11 is maintained in engagement with the surface 12 of the object 13 under sufficient pressure to insure a sealing action between the ring 30 and the surface 12 of the object 13. As the soft, resilient, flexible tube 31 extrudes between the adjacent coils of the garter spring 32, it engages the surface 13 and a positive seal is formed around the transducers 19 and 21. The oil in the sealed gap 36 assures a positive acoustic coupling between the transducers 19 and 21 and the object 13.

At the same time the ring 30 provides positive support in a plane transverse to the surface 12 of the object 13 as shown in FIG. 1 to constantly maintain the gap 36 uniform between the face of the transducers 19 and 21 and the surface 12 of the object 13.

As shown in FIGS. 1 and 2 the scanning head 11 is moving in the direction of the arrow 40 and a surface irregularity 38 of unusual size on the surface 12 is passing under the garter spring and tube assembly 30. The surface irregularity 38 passes under the ring 30 and in this case spreads out the soft resilient coils of the garter spring 32. The surface irregularity 38 causes a zone of deflection or flattening out of the spring coils as outlined by the dotted line 41 shown in FIG. 2. But the remainder of the garter spring and tube assembly 30 remains undisturbed. The gap 36 remains constant and a uniform thickness of oil is maintained therein.

As the soft, flexible and resilient tube 31 normally extrudes through the adjacent coils of the garter spring 32 the momentary flattening out of the coils of the garter spring in the zone of deflection causes the flexible tube 31 to extrude even further between the flattened coils of the garter spring 32 into positive sealing engagement with the surface irregularity 38. This positive engagement between the tube 31 and the surface irregularity 38 substantially seals the gap 36 at all points around the circumference of the ring 30. Any oil that should happen to seep from the gap 36 is caught in the catch-groove 42 and removed through the return line 43. The wiper 37 forms a secondary seal and wipes the surface 12 clean.

When the surface irregularity 38 passes under the ring 30 the coils of the garter spring 32 within the zone of deflection spring back to their former position. The tube 31 continues to engage in sealing relation the now regular surface 12 of the object 13.

As the scanning head 11 moves with respect to the surface 12 the surface irregularity 38 passes under the transducers 19 and 21. Continued movement of the scanning head 11 brings the opposite side of the garter spring and tube assembly 30 into engagement with the irregularity 38. Again the same flattening and spreading of the coils of the garter spring 32 occurs. Again the gap 36 is substantially sealed until the scanning head 11 passes completely over the surface irregularity 38.

When an extremely large or sharp surface irregularity such as a burr or jagged edge that is higher than the depth or thickness of the gap 36 passes under the scanning head 11 the yieldably mounted transducers 19 and 21 are temporarily deflected against the compression springs 24. The compression springs 24 return the spring mounted transducers 19 and 21 to their normal operating position. The crystal holders 26 are again urged against the annular shoulder 22 in the bore 23. This feature is provided as a safeguard in the event that the scanning head 11 is improperly used. Normally the scanning head is not used to inspect objects having such large surface irregularities.

The ring 30 may be arranged in several alternative embodiments to provide the necessary spacing and sealing action. The tube 31 need not be inflated. Also as shown in FIG. 3 a garter spring 132 may be formed around a soft flexible member 131 of rubber or the like tight enough so that portions of the member 131 extrude between the adjacent coils of the spring 132. The gap oil pressure increases this extrusion effect.

Still another alternative arrangement in the spring and tube assembly 30 is shown in cross section in FIG. 4. As there shown a garter spring 232 is encased in a soft, flexible tube 231 of rubber or the like. Either of these arrangements provides a good spacing and sealing action.

Although I have described my invention in detail it will be appreciated that many changes and modifications may be made by those skilled in the art without departing from the spirit of my invention. For instance, a single sending and receiving transducer element may be readily employed. Therefore, my invention is to be limited only by the scope of the appended claims.

I claim:

1. An ultrasonic scanning head for movement along the surface of an object to be tested, comprising a main head member having a recessed portion, transducer means for producing and receiving ultrasonic vibrations mounted within said recessed portion so as to lie approximately in the plane of the scanning face of the head member, a ring mounted in and extending from the scanning face of said head member so as to surround the transducer means and make contact with the surface of said object arranged to form an enclosed, constant-width testing gap between the transducer means and said object surface, and means for maintaining a liquid couplant within said gap, said ring comprising a combined structure including form-retaining means for preventing variation across said gap, and a soft yielding sealing material coupled to said form-retaining means for engaging said surface and sealing the liquid couplant within the gap.

2. An ultrasonic scanning head for nondestructive inspection of an object, which comprises an ultrasonic scanning head having a transducer mounted therein, means for spacing the object and transducer to form a narrow gap and for sealing said gap, said means being secured to said scanning head and surrounding in approximately the same plane the scanning face of said transducer, said spacing and sealing means constituting a form-retaining member and a soft sealing material coupled thereto thereby to form a ring assembly, said ring assembly in turn maintaining a fixed length sealed gap between said transducer and the scanned surface of said object, said ring being adapted during scanning engagement with said object to compensate for surface irregularities on the object by yielding only at the affected portion of the ring assembly, the remaining portion being undisturbed so as to maintain said gap uniform in length and completely sealed, and means for maintaining a liquid couplant in said gap.

3. A spacing and sealing means for an ultrasonic gap scanning head which comprises a soft, resilient, inflated tube, and a flexible wire coiled around said tube whereby said coiled wire uniformly spaces said scanning head from an object to be scanned providing a uniform gap therebetween, and portions of said tube extrude between adjacent coils in said wire to engage said object and seal said gap.

4. An ultrasonic gap scanning head which comprises a scanning head having a recess therein and a pair of bores opening into said recess, a yieldably mounted sending transducer and receiving transducer in said scanning head, each transducer being secured within one of said bores respectively, spacing and sealing means surrounding said transducers for forming a uniform, sealed gap between said transducers and the surface of an object when said spacing and sealing means engages said object, an inlet for passing a liquid couplant into said gap, a groove formed in said head member around the periphery of said recess, said groove promoting a return flow of liquid couplant from said gap, and a catch-groove surrounding said spacing and sealing means for removing liquid couplant that escapes from said gap.

References Cited in the file of this patent

UNITED STATES PATENTS

| | | |
|---|---|---|
| 1,439,452 | Shaw | Dec. 19, 1922 |
| 1,674,038 | Glass | June 19, 1928 |
| 2,592,134 | Firestone | Apr. 8, 1952 |
| 2,956,185 | Von Stocker | Oct. 11, 1960 |

FOREIGN PATENTS

| | | |
|---|---|---|
| 1,138,633 | France | Jan. 28, 1957 |